(12) United States Patent
Treichel (10) Patent No.: US 6,276,728 B1
(45) Date of Patent: Aug. 21, 2001

(54) FITTING FOR USE WITH CORRUGATED TUBING

(75) Inventor: Steven A. Treichel, West Chester, PA (US)

(73) Assignee: Omega Flex, Inc., Westfield, MA (US)

( * ) Notice: Subject to any disclaimer, the term of this patent is extended or adjusted under 35 U.S.C. 154(b) by 0 days.

(21) Appl. No.: 09/349,869

(22) Filed: Jul. 8, 1999

(51) Int. Cl.[7] .............................. F16L 13/14; F16L 21/06; F16L 33/00
(52) U.S. Cl. ................. 285/382.7; 285/249; 285/323; 285/353; 285/903
(58) Field of Search ....................... 285/246, 247, 285/249, 255, 322, 323, 353, 382.7

(56) References Cited

U.S. PATENT DOCUMENTS

| | | |
|---|---|---|
| 96,914 | 11/1869 | Hill . |
| 163,588 | 5/1875 | Goodball . |
| 178,313 | 6/1876 | Leland . |
| 262,581 | 8/1882 | Doolittle . |
| 546,314 | 9/1895 | Farrey . |
| 2,112,238 | 3/1938 | Guarnaschelli . |
| 2,226,039 | 12/1940 | Wiltse . |
| 2,323,912 | 7/1943 | Johnson . |
| 2,357,669 | 9/1944 | Lake . |
| 2,363,586 | 11/1944 | Guarnaschelli . |
| 2,424,727 | 7/1947 | Wenk . |
| 2,430,657 | 11/1947 | Zolleis . |
| 2,496,149 | 1/1950 | Cahenzli, Jr. . |
| 2,554,585 | 5/1951 | Miller . |
| 2,848,254 | 8/1958 | Millar . |
| 2,858,147 | 10/1958 | Guarnaschelli . |
| 2,946,607 | 7/1960 | Bauer . |
| 2,991,093 | 7/1961 | Guarnaschelli . |

(List continued on next page.)

FOREIGN PATENT DOCUMENTS

| | | |
|---|---|---|
| 0474114 | 3/1992 | (EP) . |
| 2 589 979 | 11/1985 | (FR) . |
| WO 97/42442 | 11/1997 | (WO) . |

OTHER PUBLICATIONS

Titeflex "Assembly of CSST Mechanical Fittings" (Date Unknown).

* cited by examiner

Primary Examiner—Neill Wilson
(74) Attorney, Agent, or Firm—Cantor Colburn LLP (57) ABSTRACT

A fitting for use with corrugated tubing. The fitting includes a first body having a first internal conduit therethrough and a first centerline. The first body has a plurality of fingers integral with the first body. The fingers are positioned radially about a periphery of the first body and each of the fingers is separated from an adjacent finger by a space. A second body which mates with the first body has a second internal conduit therethrough and a second centerline. The second body has a finger deflection surface for contacting the fingers and directing the fingers towards the first centerline.

40 Claims, 4 Drawing Sheets

U.S. PATENT DOCUMENTS

| | | |
|---|---|---|
| 3,008,736 | 11/1961 | Samiran . |
| 3,008,738 | 11/1961 | Longfellow . |
| 3,112,937 | 12/1963 | Williams . |
| 3,294,426 | 12/1966 | Lyon . |
| 3,306,637 | 2/1967 | Press et al. . |
| 3,381,980 | 5/1968 | Smith . |
| 3,830,531 | 8/1974 | Burge . |
| 3,834,742 | 9/1974 | McPhillips . |
| 3,834,743 | 9/1974 | Strybel . |
| 3,907,177 | 9/1975 | Levin . |
| 4,032,177 | 6/1977 | Anderson . |
| 4,073,512 | 2/1978 | Vian et al. . |
| 4,250,348 * | 2/1981 | Kitayawa ................. 285/322 X |
| 4,302,036 | 11/1981 | Burge . |
| 4,423,891 | 1/1984 | Menges . |
| 4,484,770 | 11/1984 | Sloane . |
| 4,630,850 | 12/1986 | Saka . |
| 4,669,761 | 6/1987 | Huling . |
| 4,674,775 | 6/1987 | Tajima et al. . |
| 4,801,158 | 1/1989 | Gomi . |
| 4,836,580 | 6/1989 | Farrell . |
| 4,867,489 | 9/1989 | Patel . |
| 4,893,657 | 1/1990 | Usui . |
| 4,904,002 | 2/1990 | Sasa et al. . |
| 4,907,830 | 3/1990 | Sasa et al. . |
| 4,909,547 | 3/1990 | Guy . |
| 5,131,145 | 7/1992 | Badoureaux . |
| 5,131,696 * | 7/1992 | Sykes et al. ................. 285/903 X |
| 5,230,539 | 7/1993 | Olson . |
| 5,261,707 * | 11/1993 | Kotake et al. ................. 285/903 X |
| 5,354,107 | 10/1994 | Takikawa . |
| 5,413,147 | 5/1995 | Moreiras et al. . |
| 5,423,578 | 6/1995 | Kanomata et al. . |
| 5,441,312 * | 8/1995 | Fujiyoshi et al. ................. 285/903 X |
| 5,489,127 | 2/1996 | Anglin et al. . |
| 5,683,120 | 11/1997 | Brock et al. . |
| 5,799,989 | 9/1998 | Albino . |
| 6,036,237 | 3/2000 | Sweeney . |
| 6,079,749 | 6/2000 | Albino et al. . |

FITTING FOR USE WITH CORRUGATED TUBING

BACKGROUND OF THE INVENTION

The flexible gas piping (FGP) system, also referred to as corrugated stainless steel tubing (CSST) and formerly Interior Gas Piping (IGP) was developed in Japan and first introduced into that market by Osaka Gas and Tokyo Gas Companies during the early 1980's. The system utilizes stainless steel corrugated tubing supplied in rolls or coils with field attachable fittings to distribute gas from a central supply point such as the meter or regulator to the various appliances within a house or building. The technology, which has likened the process of plumbing a house for gas to wiring a house for electricity, substantially reduces installation time and hence the associated higher cost of labor. The technology was brought to the United States by the Gas Research Institute who saw it as a means of making gas installations more competitive; thereby increasing the percentage of new construction plumbed for gas and increasing the overall consumption of natural gas on a national basis. The technology was enthusiastically endorsed and supported by major gas utilities who had seen the significant higher cost of installed piping as their single greatest obstacle to selling more gas. Code acceptance required more time and effort to obtain, but the product is now recognized by all national model codes and ANSI, the National Fire Protection Association/National Fuel Gas Code and is tested and recognized by the American Gas Association. This product will eventually supplant black-iron pipe which accounts for approximately 80% of all fuel gas piping today, as well as copper tube which, while enjoying many of the same advantages of FGP, is being banned from this application at an increasing rate.

There have been three types of fittings originally put into the field. The first fitting introduced into the field used a fiber gasket to make the seal and no special tools were needed to assemble this fitting. This fitting has a higher incidence of leaks than the flared metal to metal seals used by other manufacturers.

The second fitting introduced into the field used first a specialized tool to flatten the convolutions at the end of the CSST tube where the fitting was to be attached and then a second tool was used to put a single flare on the tube end. This product is now off the market due to failures in the tubing caused by work hardening of the stainless steel in the flattening and flaring process.

The third type of fitting was introduced into the field using no special tools to make a metal to metal seal by folding the convolutions of the tube back on itself creating a double flare. After a limited time in the field it was realized that this fitting design was inconsistent in making a leak tight seal. The remedy to the problem was to design an insert type flaring tool; this was used for about three years. A second redesign was conducted, upgrading the insert tool to a socket type flaring tool.

A current problem in installing certain fittings is the number of loose parts that the installer must assemble in the field. In a typical fitting, there are a body, a nut, a gasket and two split ring washers that must be assembled to couple the fitting to the corrugated tubing. This number of parts leads to several disadvantages including complicated assembly and the need to carry extra parts to compensate for lost or damaged parts.

SUMMARY OF THE INVETION

The above-discussed and other drawbacks and deficiencies of the prior art are overcome or alleviated by the fitting of the present invention. The fitting includes a first body having a first internal conduit therethrough and a first centerline. The first body has a plurality of fingers integral with the first body. The fingers are positioned radially about a periphery of the first body and each of the fingers is separated from an adjacent finger by a space. A second body which mates with the first body has a second internal conduit therethrough and a second centerline. The second body has a finger deflection surface for contacting the fingers and directing the fingers towards the first centerline.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Figure 1:
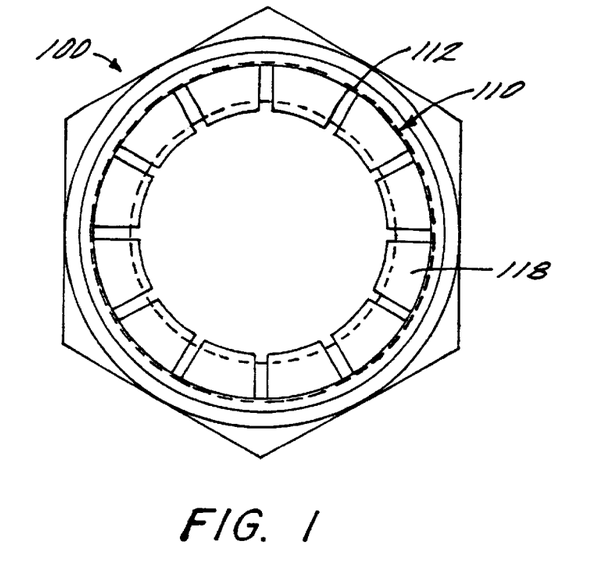
FIG. 1 is a front view of a first body.
Figure 2:
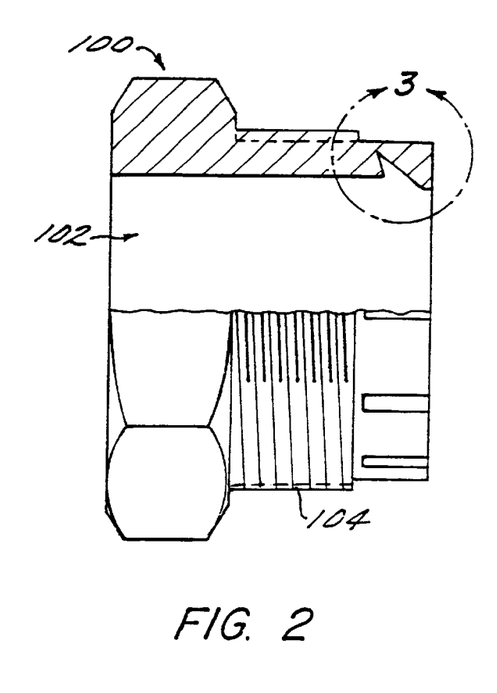
FIG. 2 is a side view, in partial cross-section, of the first body.
Figure 3:
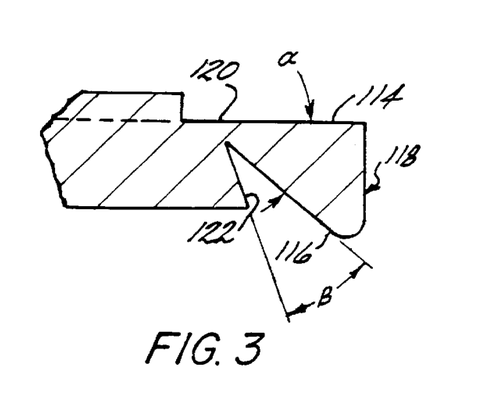
FIG. 3 is a cross-sectional view of a portion of FIG. 2.

The fitting of the present invention is made up of a first body and a second body. FIG. 1 is an end view of a first body 100 and FIG. 2 is a side view, in partial cross-section, of the first body 100. First body 100 includes a central conduit 102 and external threads 104 for engaging threads on second body 200. Formed integral with first body 100 are a plurality of fingers 110 arranged radially about the first body 100. Adjacent fingers 110 are separated by a space 112. FIG. 3 is an enlarged, cross sectional view of a finger 110. Finger 110 includes an outside surface 114, an inside surface 116 and a front face 118. The outside diameter of threads 104 is greater than the outside diameter of fingers 110.

The finger 110 has a varying thickness from front face 118 to the base 120 where finger 110 joins the remainder of first body 100. The finger 110 is thickest at front face 118 and the thickness decreases as the inside surface 116 approaches the base 120. The inside surface 116 is at an angle a relative to outside surface 114 and relative to the centerline of first body 100. In an exemplary embodiment, a is 40 degrees. A finger stop surface 122 is provided on the inside of body 100 opposite inside surface 116. As described herein, finger 110 is bent inwards towards the centerline of body 100 during installation. The finger stop surface 122 serves to stop deflection of finger 110 beyond a certain point. The finger stop surface 122 is at angle β relative to inside surface 116. In an exemplary embodiment, β is 30 degrees.

As shown in FIG. 1, the front face 118 of each finger 110 is trapezoidal. The base of the trapezoid is located towards the outside of the body 100. When the fingers 110 are deflected inwards during installation, the base of the trapezoidal front face 118 contacts the base of the front face of an adjacent finger. This creates a continuous ring to provide a sealing surface as described herein.

Figure 4:
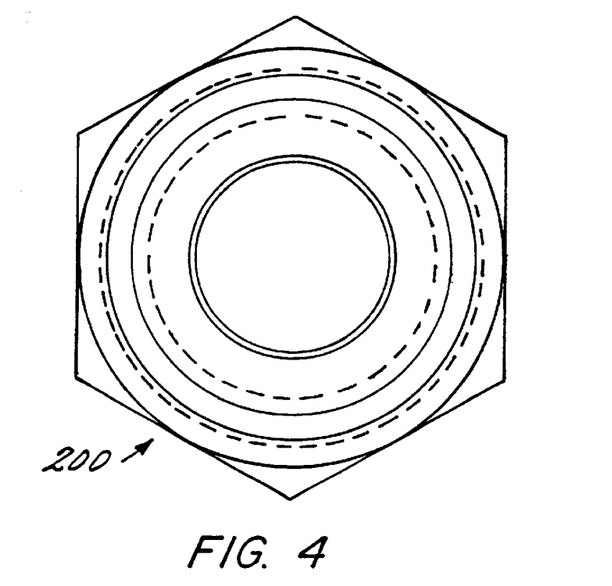
FIG. 4 is a front view of a second body.
Figure 5:
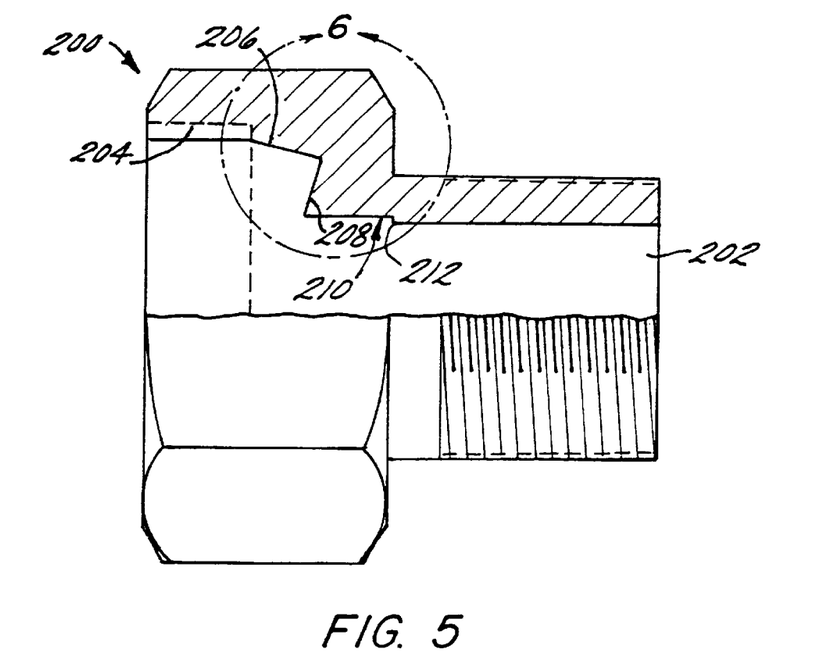
FIG. 5 is a side view, in partial cross-section, of the second body.
Figure 6:
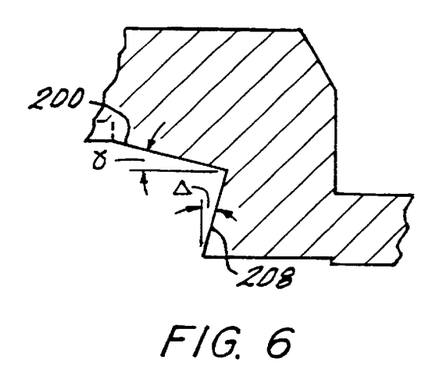
FIG. 6 is a cross-sectional view of a portion of FIG. 5.

FIG. 4 is an end view of a second body 200 and FIG. 5 is a side view, in partial cross-section, of the second body 200. Second body 200 includes a central conduit 202 which communicates with conduit 102 to allow gas to travel through the fitting. Second body 200 includes internal threads 204 that engage external threads 104 on first body 100. The inside surface of second body 200 includes a finger deflection surface 206 and a sealing surface 208. As shown in FIG. 6, the finger deflection surface 206 is frusto-conical and is at an angle γ relative to the centerline of second body 200. In an exemplary embodiment, γ is 15 degrees. The finger deflection surface 206 has a largest inner diameter greater then the outer diameter of fingers 210. The internal threads 204 have an inside diameter greater than the largest inside diameter of finger deflection surface 206. The finger deflection surface 206 contacts finger 110 and deflects the fingers 110 towards the centerline of first body 100. Sealing surface 208 is used to seal the corrugated tubing as described herein with reference to FIGS. 9–11. Sealing surface 208 is at an angle Δ relative to a normal to the centerline of the second body 200. In an exemplary embodiment, Δ is 15 degrees.

Figures 7, 8:
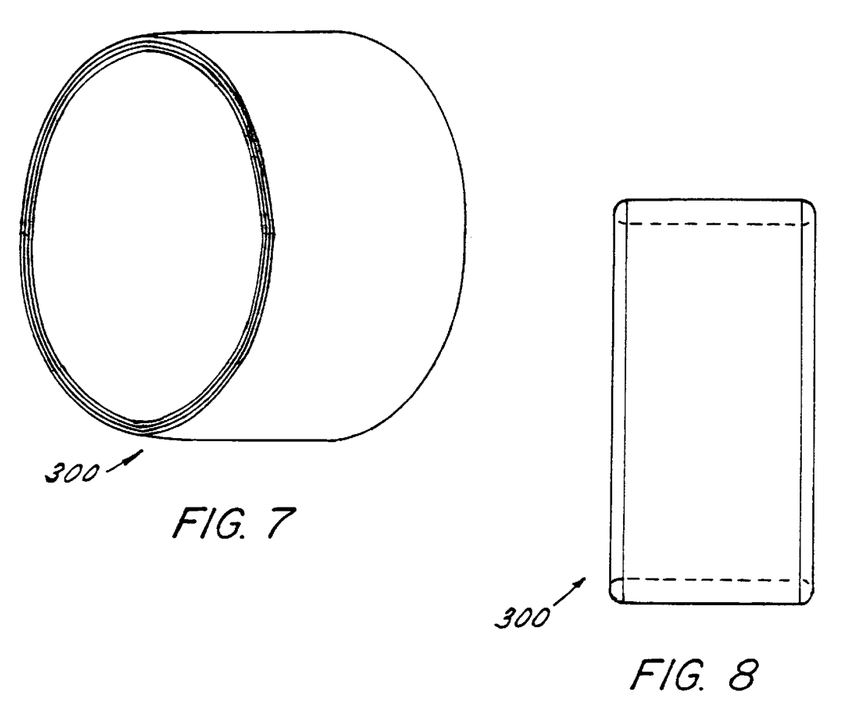
FIG. 7 is a perspective view of a locating sleeve.
FIG. 8 is a side view of the locating sleeve.

Second body 200 also includes a shoulder 212 which is formed by an area of increased diameter 210 in central conduit 202. The shoulder 212 serves as a stop to position a locating sleeve 300 (FIGS. 7 and 8) relative to second body 200. The locating sleeve is similar to that disclosed in U.S. Pat. No. 5,799,989, the contents of which are incorporated herein by reference, and pending application Ser. No. 08/905,373, the contents of which are incorporated herein by reference. The locating sleeve 300 is press fit into second body 200. Alternatively, the locating sleeve 300 may be formed integral with second body 200. The locating sleeve 300 is generally cylindrical, and may include a tapered section to facilitate insertion. As described herein, the locating sleeve helps to position the corrugated tubing upon installation of the fitting.

Figure 9:
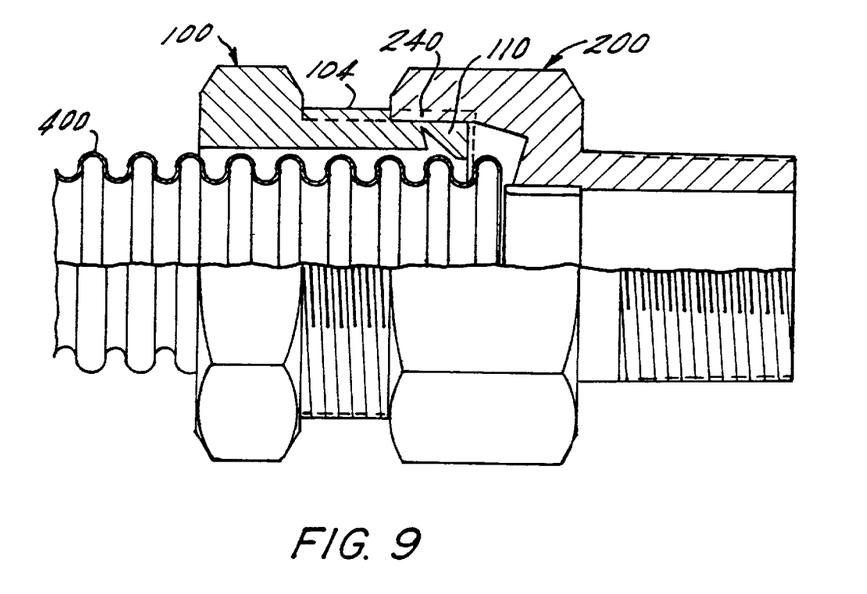
FIG. 9 is a side view, in partial cross section, of the first body partially engaging the second body.

Installation of the fitting will now be described with reference to FIGS. 9–10. As shown in FIG. 9, the first body 100 and second body 200 may be partially joined by mating threads 104 with threads 204. The corrugated tubing 400 is cut in a valley and is snapped into the first body 100 so that fingers 110 are positioned in the first valley adjacent to the cut end of the tubing 400. The smallest inner diameter of the fingers 110 is less than the outer diameter of peaks on the corrugated tubing but greater than the outer diameter of the valleys of the corrugated tubing. Accordingly, when the corrugated tubing 400 is inserted in first body 100, a peak of the corrugated tubing 400 engages the fingers 110. The fingers 110 are resilient and spread outward slightly to allow the peak on the corrugated tubing to clear the fingers 110. Once the peak of the tubing 400 clears the fingers 110, the fingers 110 return to their original position and rest in a valley of the tubing. This interference between fingers 110 and the tubing 400 secures first body 100 to the tubing 400.

The outer diameter of the threads 104 and corresponding inner diameter of threads 204 provides a clearance 240 between the threads 204 and the fingers 110. This clearance allows the fingers 110 to deflect away from the centerline of the first body 100 without interference from the second body 200. This allows the first body 100 and second body 200 to be partially engaged when the corrugated tubing 400 is snapped into the first body 100. This facilitates installation in that the first body 100 is partially engaged with second body 200 providing the installer with a single component.

The second step is to create a seal by rotating the second body 200 relative to the first body 100 thereby drawing the first body 100 into second body 200. As first body 100 enters second body 200, the outside surface 116 of fingers 110 engage finger deflection surface 206. As the fingers 110 travel along finger deflection surface 206, the fingers 110 are deflected inwards toward the corrugated tubing 400. Locating sleeve 300 also enters the tubing 400 to locate the tubing 400 relative to the second body 200.

Figure 10:
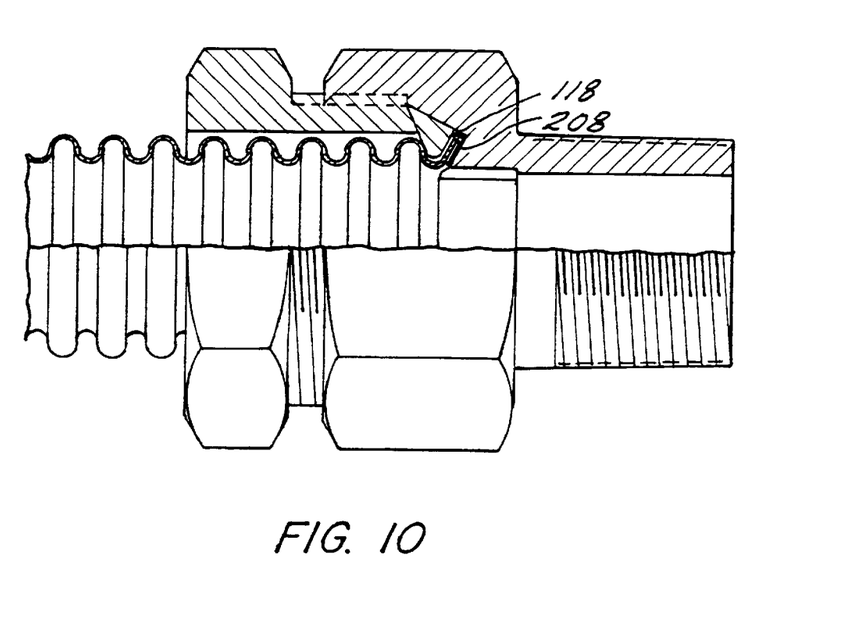
FIG. 10 is a side view, in partial cross section, of the first body fully engaging the second body.

The first body 100 and second body 200 continue to be tightened until a seal is achieved as shown in FIG. 10. The fingers 110 have been deflected inwards and two layers of corrugated tubing 400 are compressed between the front face 118 of each finger 110 and the sealing surface 208. The two layers of tubing, or double flare, provides a metal-to-metal seal that prevents leakage.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fitting for use with corrugated tubing, said fitting comprising:
    a first body having an first internal conduit therethrough and a first centerline, said first body including a plurality of fingers integral with said first body, said fingers positioned radially about a periphery of said first body, each of said fingers being separated from an adjacent finger by a space, said first body having first threads; and
    a second body which mates with said first body, said second body having a second internal conduit therethrough and a second centerline, said second body having a finger deflection surface for contacting said fingers and directing said fingers towards said first centerline, said second body having second threads for engaging said first threads to couple said first body and said second body.

2. The fitting of claim 1 wherein:
    said fingers have an inner diameter less than a maximum outer diameter of the corrugated tubing.

3. The fitting of claim 1 wherein:
    said finger deflection surface is a frusto-conical surface at a third angle relative to said second centerline.

4. The fitting of claim 1 wherein:
    said second body includes a sealing surface, each of said fingers and said sealing surface compressing said corrugated tubing.

5. The fitting of claim 4 wherein:
    said sealing surface is at a fourth angle relative to a normal of said second centerline.

6. The fitting of claim 5 wherein:
    said finger deflection surface is a frusto-conical surface at a third angle relative to said second centerline; and,
    said third angle equals said fourth angle.

7. The fitting of claim 1 wherein:
    each of said fingers has an outside surface and an inside surface, said inside surface being at a first angle relative to said first centerline.

8. The fitting of claim 7 wherein:
    each of said fingers has a base at the junction between said finger and a remainder of said first body and a front face, a thickness of each of said fingers varying from said front face to said base.

9. The fitting of claim 7 wherein:

said body includes a finger stop surface positioned opposite said inside surface, said finger stop surface being at a second angle relative to said inside surface.

10. The fitting of claim 1 further comprising:

a locating sleeve connected to said second body for entering the corrugated tubing and aligning said second body with said corrugated tubing.

11. The fitting of claim 1 further comprising:

a locating sleeve connected to said second body for entering the corrugated tubing and aligning said second body with said corrugated tubing.

12. The fitting of claim 2 wherein:

said locating sleeve is press fit in said second body.

13. A fitting for use with corrugated tubing, said fitting comprising:

a first body having an first internal conduit therethrough and a first centerline, said first body including a plurality of fingers integral with said first body, said fingers positioned radially about a periphery of said first body, each of said fingers being separated from an adjacent finger by a space; and a second body which mates with said first body, said second body having a second internal conduit therethrough and a second centerline, said second body having a finger deflection surface for contacting said fingers and directing said fingers towards said first centerline wherein:

each of said fingers has an outside surface and an inside surface, said inside surface being at a first angle relative to said first centerline.

14. The fitting of claim 2 wherein:

each of said fingers has a base at the junction between said finger and a remainder of said first body and a front face, a thickness of each of said fingers varying from said front face to said base.

15. The fitting of claim 13 wherein:

said body includes a finger stop surface positioned opposite said inside surface, said finger stop surface being at a second angle relative to said inside surface.

16. The fitting of claim 2 wherein:

said fingers have an inner diameter less than a maximum outer diameter of the corrugated tubing.

17. The fitting of claim 2 further comprising:

a locating sleeve connected to said second body for entering the corrugated tubing and aligning said second body with said corrugated tubing.

18. The fitting of claim 17 wherein:

said locating sleeve is press fit in said second body.

19. The fitting of claim 2 wherein:

said finger deflection surface is a frusto-conical surface at a third angle relative to said second centerline.

20. The fitting of claim 2 wherein:

said second body includes a sealing surface, each of said fingers and said sealing surface compressing said corrugated tubing.

21. The fitting of claim 20 wherein:

said sealing surface is at a fourth angle relative to a normal of said second centerline.

22. The fitting of claim 21 wherein:

said finger deflection surface is a frusto-conical surface at a third angle relative to said second centerline; and, said third angle equals said fourth angle.

23. A fitting for use with corrugated tubing, said fitting comprising:

a first body having an first internal conduit therethrough and a first centerline, said first body including a plurality of fingers integral with said first body, said fingers positioned radially about a periphery of said first body, each of said fingers being separated from an adjacent finger by a space; and a second body which mates with said first body, said second body having a second internal conduit therethrough and a second centerline, said second body having a finger deflection surface for contacting said fingers and directing said fingers towards said first centerline; and, a locating sleeve connected to said second body for entering the corrugated tubing and aligning said second body with said corrugated tubing.

24. The fitting of claim 6 wherein:

said locating sleeve is press fit in said second body.

25. The fitting of claim 23 wherein:

each of said fingers has an outside surface and an inside surface, said inside surface being at a first angle relative to said first centerline.

26. The fitting of claim 25 wherein:

each of said fingers has a base at the junction between said finger and a remainder of said first body and a front face, a thickness of each of said fingers varying from said front face to said base.

27. The fitting of claim 23 wherein:

said fingers have an inner diameter less than a maximum outer diameter of the corrugated tubing.

28. The fitting of claim 23 wherein:

said body includes a fitting stop surface positioned opposite said inside surface, said finger stop surface being at a second angle relative to said inside surface.

29. The fitting of claim 23 wherein:

said finger deflection surface is a frusto-conical surface at a third angle relative to said second centerline.

30. The fitting of claim wherein:

said second body includes a sealing surface, each of said fingers and said sealing surface compressing said corrugated tubing.

31. The fitting of claim 30 wherein:

said sealing surface is at a fourth angle relative to a normal of said second centerline.

32. The fitting of claim 31 wherein:

said finger deflection surface is a frusto-conical surface at a third angle relative to said second centerline; and, said third angle equals said fourth angle.

33. A fitting for use with corrugated tubing, said fitting comprising:

a first body having an first internal conduit therethrough and a first centerline, said first body including a plurality of fingers integral with said first body, said fingers positioned radially about a periphery of said first body, each of said fingers being separated from an adjacent finger by a space; and a second body which mates with said first body, said second body having a second internal conduit therethrough and a second centerline, said second body having a finger deflection surface for contacting said fingers and directing said fingers towards said first centerline;

wherein said second body includes a sealing surface, each of said fingers and said sealing surface compressing said corrugated tubing and, said sealing surface is at a fourth angle relative to a normal of said second centerline.

34. The fitting of claim 33 wherein:

said finger deflection surface is a frusto-conical surface at a third angle relative to said second centerline; and, said third angle equals said fourth angle.

35. The fitting of claim 33 wherein:

each of said fingers has an outside surface and an inside surface, said inside surface being at a first angle relative to said first centerline.

36. The fitting of claim 35 wherein:

each of said fingers has a base at the junction between said finger and a remainder of said first body and a front face, a thickness of each of said fingers varying from said front face to said base.

37. The fitting of claim 35 wherein:

said body includes a fitting stop surface positioned opposite said inside surface, said finger stop surface being at a second angle relative to said inside surface.

38. The fitting of claim 33 wherein:

said fingers have an inner diameter less than a maximum outer diameter of the corrugated tubing.

39. The fitting of claim 33 further comprising:

a locating sleeve connected to said second body for entering the corrugated tubing and aligning said second body with said corrugated tubing.

40. The fitting of claim 9 wherein:

said finger deflection surface is a frusto-conical surface at a third angle relative to said second centerline.

* * * * *

UNITED STATES PATENT AND TRADEMARK OFFICE
CERTIFICATE OF CORRECTION

PATENT NO. : 6,276,728 B1
DATED : August 21, 2001
INVENTOR(S) : Steven A. Treichel It is certified that error appears in the above-identified patent and that said Letters Patent is hereby corrected as shown below:

Title page,
Item [56], References Cited, U.S. PATENT DOCUMENTS, delete "Goodball" and insert therefor -- Goodall --

Column 2,
Line 55, after "angle" delete "a" and insert therefor -- $\alpha$ --
Line 57, after "embodiment" delete "a" and insert therefor -- $\alpha$ --

Signed and Sealed this

Twenty-second Day of March, 2005

JON W. DUDAS
*Director of the United States Patent and Trademark Office*